(12) United States Patent  
Pals

(10) Patent No.: US 10,487,916 B1  
(45) Date of Patent: Nov. 26, 2019

(54) SEALED GREASABLE SWIVEL CONNECTOR

(71) Applicant: Scott R. Pals, Effingham, IL (US)

(72) Inventor: Scott R. Pals, Effingham, IL (US)

(*) Notice: Subject to any disclaimer, the term of this patent is extended or adjusted under 35 U.S.C. 154(b) by 202 days.

(21) Appl. No.: 15/721,819

(22) Filed: Sep. 30, 2017

(51) Int. Cl.  
*F16G 15/08* (2006.01)  
*F16C 33/78* (2006.01)  
*F16G 11/08* (2006.01)  
*F16L 1/12* (2006.01)

(52) U.S. Cl.  
CPC .......... *F16G 15/08* (2013.01); *F16C 33/7826* (2013.01); *F16C 33/7836* (2013.01); *F16C 33/7886* (2013.01); *F16L 1/12* (2013.01)

(58) Field of Classification Search  
CPC .. F16G 11/08; F16G 15/08; Y10T 403/32181; Y10T 403/32213; Y10T 403/32975; Y10T 403/32983  
See application file for complete search history.

(56) References Cited

U.S. PATENT DOCUMENTS

| | | | |
|---|---|---|---|
| 1,786,081 A | 12/1930 | Nourse et al. | |
| 2,400,291 A | 5/1946 | D Aleo et al. | |
| 2,755,641 A | 7/1956 | Dunn et al. | |
| 2,823,944 A | 2/1958 | Anderson et al. | |
| 3,504,935 A | 4/1970 | Gullihur | |
| 4,482,264 A | 11/1984 | Kodera et al. | |
| 4,561,797 A | 12/1985 | Aldridge et al. | |
| 4,669,907 A | 6/1987 | Patton et al. | |
| 4,687,365 A | 8/1987 | Promersberger et al. | |
| 5,024,548 A | 6/1991 | Timmington et al. | |
| 5,399,042 A * | 3/1995 | Ivel | E21B 7/28 403/165 |
| 5,607,248 A | 3/1997 | Hasse et al. | |
| 5,607,257 A * | 3/1997 | Brewis | E21B 7/28 285/276 |
| 5,772,350 A * | 6/1998 | Ferguson | F16G 15/08 277/345 |
| 6,554,524 B1 | 4/2003 | Smith | |
| 6,637,969 B2 | 10/2003 | Crane et al. | |
| 2016/0146258 A1 | 5/2016 | Martin | |

FOREIGN PATENT DOCUMENTS

| | | | | |
|---|---|---|---|---|
| GB | 1105593 | * | 3/1968 | ............ F16G 15/08 |
| GB | 1 553 080 | * | 9/1979 | ............ F16G 15/08 |
| GB | 2 085 547 | * | 4/1982 | ............ F16G 15/08 |

* cited by examiner

*Primary Examiner* — Michael P Ferguson  
(74) *Attorney, Agent, or Firm* — Grace J. Fishel

(57) ABSTRACT

A sealed greasable swivel connector for underground use in directional drilling operations. The swivel connector has first and second swivel heads with pulling eyes. The first swivel head is pressfit into a tubular member and welded in place. The second swivel head is welded to a bolt in a bearing arrangement which is sealed with a bushing in the tubular member and allows for rotational movement between the first swivel head/tubular member and second swivel head/bolt. A zerk fitting is provided in first swivel head for flushing any drilling mud through the bushing that may find its way into the connector out of the tubular member.

9 Claims, 5 Drawing Sheets

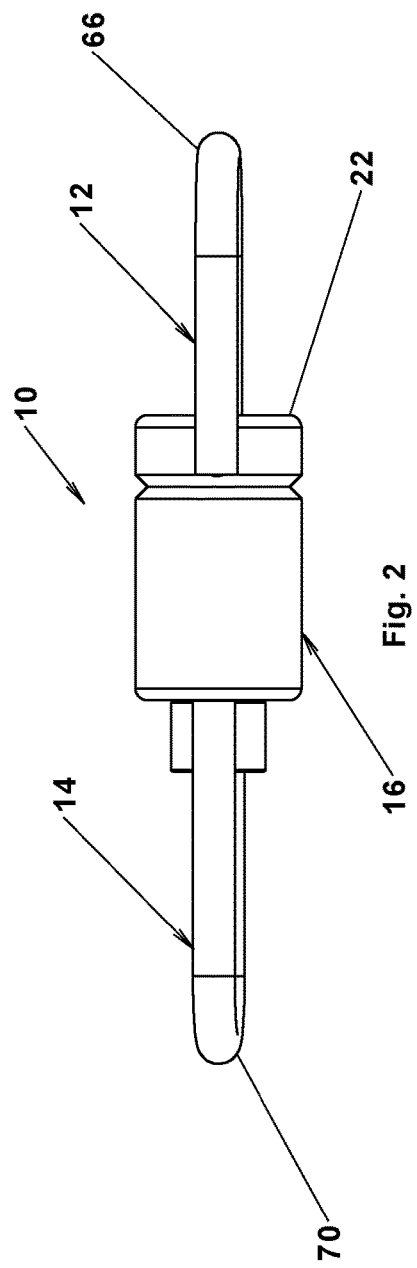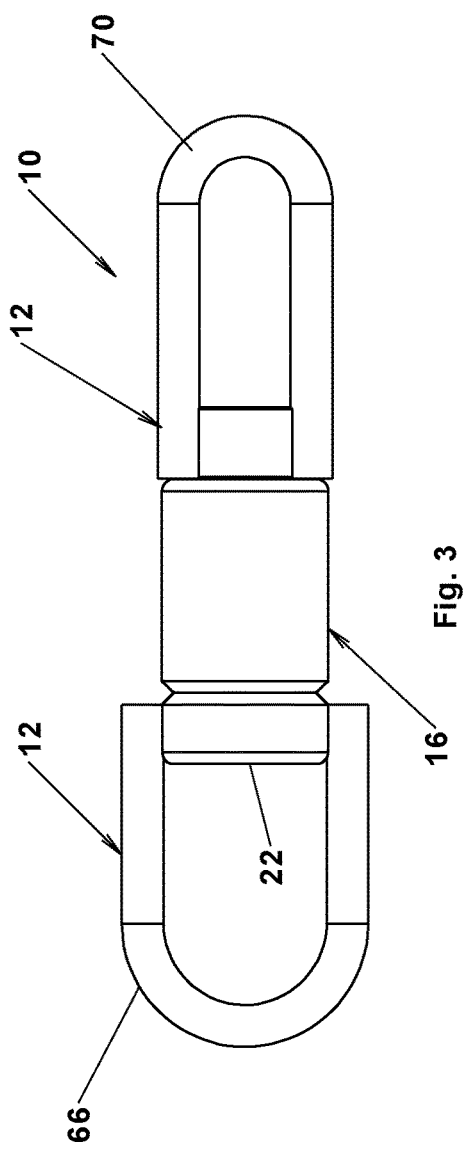

US 10,487,916 B1

SEALED GREASABLE SWIVEL CONNECTOR

BACKGROUND OF THE INVENTION

Field of the Invention

The present invention relates to a sealed greasable swivel connector for use in connecting utility products such as cable or conduit to drill or pipe strings in directional boring operations.

Brief Description of the Prior Art

In directional boring the product is installed by pulling the drill or pipe string back through the bore that has been created by various drilling and reaming methods. A swivel is used to connect the product to the drill or pipe string such that the drill or pipe string may rotate while pulling the product without requiring the product to rotate which might damage it. Existing swivel connectors are prone to failure because of the harsh environment and high forces that are experience in typical product installations. More specifically, the swivel connector may be exposed to drilling fluid such as a mixture of water and bentonite known in the industry as "mud." This liquid is used as a coolant for the cutting tools, holding the drilled hole open and to lubricate the product being installed. If the mud gets into the swivel connector the bentonite tends to erode the bearings. To prevent this from happening what is needed is a better sealed swivel connector with grease flow through to flush out any mud that may get into the connector while providing good pull force integrity.

BRIEF SUMMARY OF THE INVENTION

In view of the above, it is an object of the present invention to provide a sealed swivel connector for directional boring with grease flow through. It is another object to provide to a sealed greasable swivel connector with good pull force integrity. Other objects and features of the invention will be in part apparent and in part pointed out hereinafter.

In accordance with the invention, a sealed greasable swivel connector for underground use in directional boring operations has first and second swivel heads with pulling eyes. The first swivel head is pressfit into a tubular member and welded in place. The second swivel head is welded to a bolt in a bearing arrangement which is sealed with a bushing in the tubular member and allows for rotational movement between the first swivel head/tubular member and second swivel head/bolt. A zerk fitting is provided in first swivel head for flushing any drilling mud through the bushing that may find its way into the connector out of the tubular member.

In an embodiment of the sealed greasable swivel connector the first swivel head includes a cap with a neck which is inserted into the tubular member. The cap has a sloped shoulder which intersects the neck forming a seal receiving space for a fillet of weld connecting the first swivel head to the tubular member and forming a substantially air-tight seal between the first swivel head and the tubular member.

In an embodiment of the sealed greasable swivel connector the second swivel head is a nut with a bore threaded for attachment to a threaded end of the bolt in the bearing arrangement. The nut has a recess for groove welding the nut to the threaded end of bolt. In some embodiments the bolt is a shoulder bolt with a length such that the shoulder is in alignment with the end of tubular member when the nut is threaded on the bolt in the bearing arrangement.

In other embodiments the pulling eyes are formed from rods bent into loops, the ends of which are lap welded to opposing sides of the cap in the first swivel head and the nut in the second swivel head. Alignment grooves in the cap and nut may be provided to facilitate placement of the ends of the rods for welding.

Still further embodiments will be in part apparent and in part pointed out hereinafter. The scope of the invention being indicated by the subjoined claims.

The invention summarized above comprises the constructions hereinafter described, the scope of the invention being indicated by the subjoined claims.

BRIEF DESCRIPTION OF THE SEVERAL VIEWS OF THE DRAWINGS

In the accompanying drawings, in which several of various possible embodiments of the invention are illustrated, corresponding reference characters refer to corresponding parts throughout the several views of the drawings in which:

FIG. 2 is a side view of the swivel connector shown assembled;

FIG. 3 is a plan view of the swivel connector;

DETAILED DESCRIPTION OF AT LEAST ONE PREFERRED EMBODIMENT OF THE INVENTION

Figure 1:
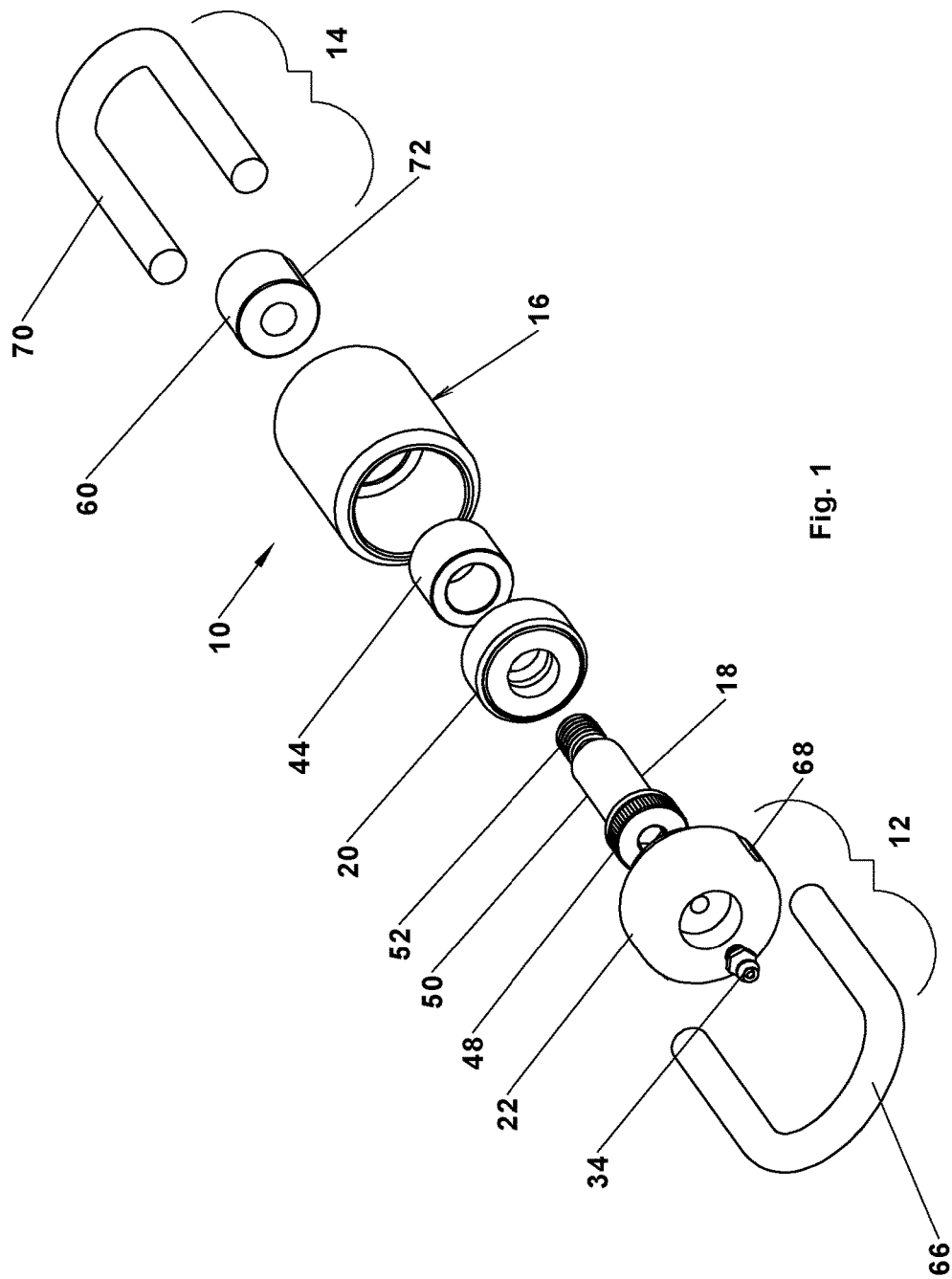
FIG. 1 is an exploded view of a sealed greasable swivel connector in accordance with the present invention.
Figure 5:
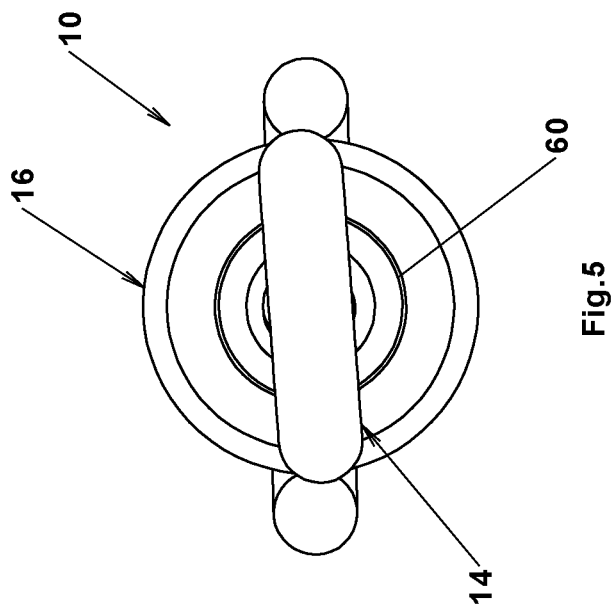
FIG. 5 is an end view of the swivel connector viewed from a nut end.
Figure 4:
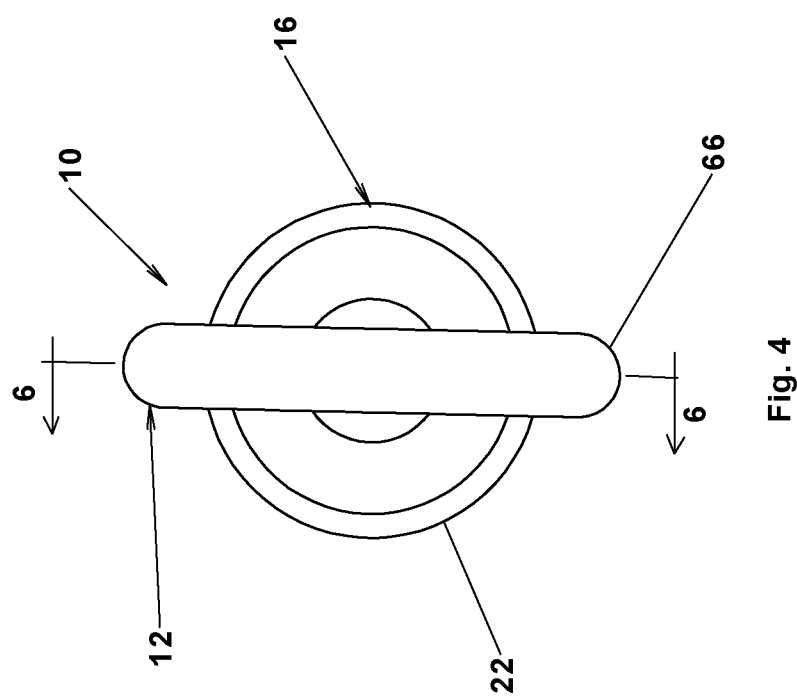
FIG. 4 is an end view of the swivel connector viewed from a cap end.

Referring to the drawings more particularly by reference character, a sealed greasable swivel connector 10 includes a first swivel head 12 connectable to a load line and a second swivel head 14 connectable to another line. First swivel head 12 is connected to a tubular member 16 and second swivel head 14 is connected by a bolt 18 to a bearing 20 that allows for rotational movement between first swivel head 12/tubular member 16 and second swivel head 14/bolt 18.

Figure 8:
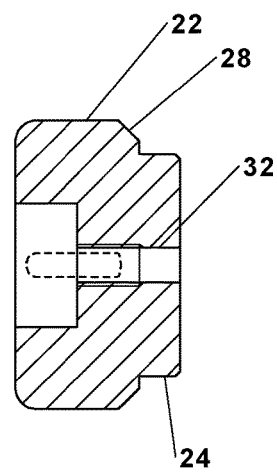
FIG. 8 is a sectional view taken along the plane of 8-8 in FIG. 7.
Figure 10:
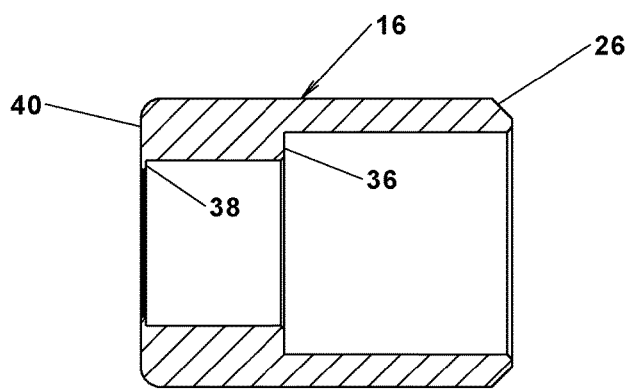
FIG. 10 is a sectional taken along the plane of 10-10 in FIG. 9.
Figure 9:
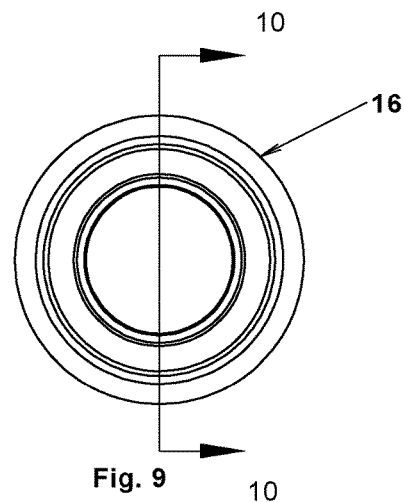
FIG. 9 is an end view of a tubular member.
Figure 12:
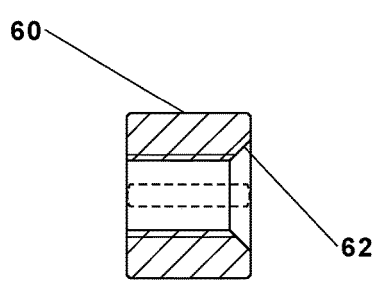
FIG. 12 is a sectional view taken along the plane of 12-12 in FIG. 11.
Figure 11:
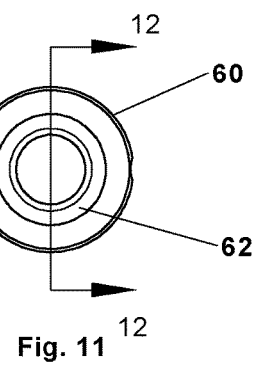
FIG. 11 is an end view of the nut.

As shown, first swivel head 12 is includes a cap 22 with a cylindrical neck 24 (FIGS. 6 and 8) sized for pressfit into a first end 26 (FIGS. 6 and 10) of tubular member 16 with a barrel cavity. Best seen in FIG. 6, cap 22 has a shoulder 28 which intersects the neck forming a seal receiving space between cap 22 and first end 26 of tubular member 16. A fillet of weld 30 (FIG. 6) is applied in the seal receiving space connecting cap 22 to first end 26 of tubular member 16 and forming a metal air-tight seal between the cap and the tubular member. An opening 32 (FIGS. 6 and 8) is provided through cap 22 and neck 24 into which is seated, threaded or pressfit, a grease zerk 34 for supplying grease into barrel cavity of tubular member 16.

Figure 6:
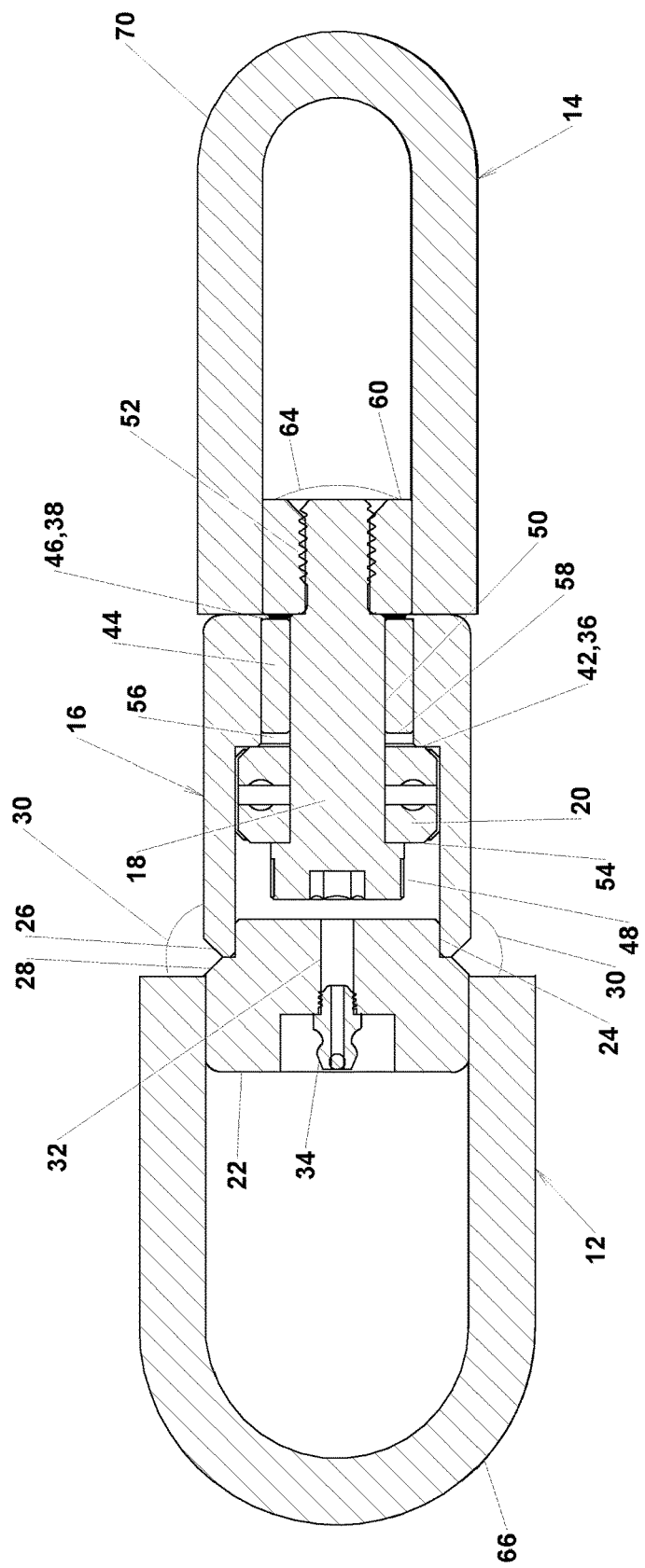
FIG. 6 is a sectional view taken along the plane of 6-6 in FIG. 4.
Figure 7:
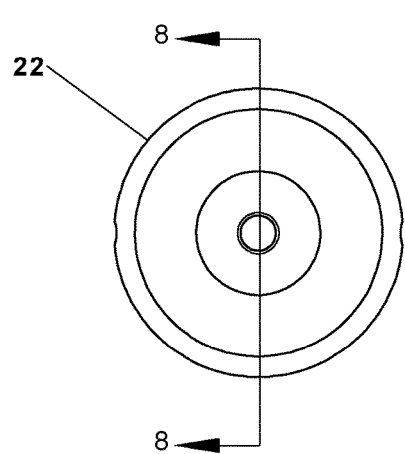
FIG. 7 is a end view of the cap.

Tubular member 16 has a first annual shoulder 36 (FIG. 10) intermediate its length and a second annual shoulder 38 (FIG. 10) proximate its second end 40. Bearing 20 such as a ball or roller thrust bearing with upper and lower races is slide fitted into tubular member 16 with a first side 42 abutted against first annular shoulder 36 (FIG. 6). A bushing 44 such as a self-lubricating bronze bushing is press fitted into tubular member 16 with a first side 46 abutted against second annular shoulder 38 (FIG. 6). A suitable bolt 18 such as a shoulder bolt with a head 48, shank 50 and threaded end 52 is passed through bearing 20 and bushing 44 with head 48 of bolt 18 abutted against a second side 54 of bearing 20 and with a space 56 formed between first side of bearing 42 and a second side 58 of bushing 44.

Second swivel head 14 includes a nut 60 with a threaded bore for attachment to threaded end 52 of bolt 18. Nut 60 includes a V-groove 62 in its outer side such that when the nut is threaded on the bolt, a groove weld 64 fixes nut 60 on bolt 18 such that the bolt allows for rotational movement between first swivel head 12/tubular member 16 and second swivel head 14/bolt 18 in bearing 20 and bushing 44.

First swivel head 12 is connectable to the load line with a pulling eye 66 comprising a rod forming a first loop welded to opposite sides of cap 22. Alignment of the ends of first loop on cap 22 for welding is facilitated with alignment grooves 68 (FIG. 1) in cap 22. Similarly, second swivel head 14 is connectable to the other load line with a pulling eye 70 comprising a rod forming a second loop lap welded to opposite side of nut 60 which may be provided with alignment grooves 72 for positioning the ends of second loop on nut 60 for welding.

After swivel connector 10 is assembled, grease may be injected into the cavity of tubular member 16 through zerk fitting 34. Under pressures of 3000# or so second annular shoulder 38 prevents bushing 44 from being extruded from tubular member 16. Because first swivel head 12 is metal sealed to tubular member 16 at first end 26 any flow of grease is through bushing 44 thereby blocking the inflow of any bentonite or other debris into the cavity.

When a pulling force is applied to swivel connector 10, the load on first eye 66 is transferred to tubular member 16 by the welded on cap 22. The load on second eye 70 is also transferred to tubular member 16 through head 48 of bolt 18 on bearing 20. Bearing 20 abuts first annual shoulder 36 which is a structural part of tubular member 16. The arrangement thus provides great pulling force integrity.

The following provides an example of component size for swivel connector 10. Tubular member has a length of 2.25 inches, an outside diameter of 1.75 inches, an inside diameter of 1.34 inches at first end 26, 1.00 inches at first shoulder 36 and 0.89 inches at second shoulder 38. Cap 22 has a diameter of 2.16 inches and a length of 0.75 inches and neck 24 has a diameter of 1.34 inches and a length of 0.25 inches. Shoulder 28 has a length 0.13 inches set at an angle 45 degrees. The recess for the zerk fitting is centered in the cap with a diameter of 0.75 inches and a depth of 0.38 inches. Nut 60 has a diameter of 1.00 inches and a length of 0.75 inches with a center bore having a diameter of 0.422 and a V-groove 0.02 inches deep at an angle of 45 degrees. The rods for pulling eyes 33 and 70 are 8.00 inches long. The metal out which tubular member 16 and nut 60 is formed is cold rolled steel. Bearing 20 is an B3 INA bearing (MSC Industrial Direct Co., Inc., St. Louis, Mo.) and has an outside diameter of 1.0 inch, inside diameter of ⅝ inch and is ¾ inch long. Bushing 44 is an EP1016-12 bushing (Beemer Precision, Inc., Fort Washington, Pennsylvania) and has a 1.0 inch outside diameter, inside diameter of ⅝ inch and is ¾ inch long. Shoulder bolt 18 is a Holochrome shoulder bolt 08102 (Holo-Krome, Wallingford, Conn.) and has an outside diameter of ⅝ inch and a length of 1.5 inches. Variations in the above will occur to those skilled in the art.

In use, the embodiment described above had a pulling strength greater than 25,000 pounds before failure of the first and second pulling eyes 66, 70 or bolt 18. In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A sealed greasable swivel connector comprising:
   a first swivel head connectable to a load line and a second swivel head connectable to another line,
   said first swivel head having a cap with a cylindrical neck pressfit into a first end of a tubular member with a barrel cavity, said cap having a shoulder which intersects the neck forming a seal receiving space between the cap and the first end of the tubular member, a fillet of weld material in the seal receiving space connecting the cap to the first end of the tubular member and forming a metal substantially air-tight seal between the cap and the first end of the tubular member, an opening through the cap and the neck into which is seated a grease zerk for supplying grease into the barrel cavity of the tubular member,
   said tubular member having a bore with a diameter and a first annular shoulder intermediate its length reducing the diameter of the bore and a second annular shoulder proximate its second end further reducing the diameter of the bore, a bearing with upper and lower races inserted into the tubular member with a first side abutted against the first annular shoulder, a self-lubricating bushing inserted into the tubular member on the first annular shoulder with a first side abutted against the second annular shoulder and with a space formed between a second side of the bushing and the first side of the bearing, a bolt having a head, shank and threaded end, said head of the bolt abutted against a second side of the bearing with the shank passing through the bearing and bushing,
   said second swivel head having a nut with a bore threaded for attachment to the threaded end of the bolt, said nut welded in place on the threaded end of the bolt, said bolt allowing for rotational movement between the first swivel head/tubular member and the second swivel head/bolt in the bearing and bushing,
   said nut having a weld receiving recess in an outer side with a groove weld in the weld receiving space for attaching the nut to the threaded end of the bolt.

2. The sealed greasable swivel connector of claim 1 wherein the first swivel head is connectable to the load line with a pulling eye comprising a first loop welded to opposite sides of the cap and the second swivel head is connectable to the other load line with a pulling eye comprising a second loop welded to opposite sides of the nut.

3. The sealed greasable swivel connector of claim 2 wherein the first and second loops are formed from a rod and wherein the cap has opposing alignment grooves for receipt of first and second ends of the first loop and wherein the nut has opposing alignment grooves for receipt of first and second ends of the second loop to facilitate proper placement of the first and second loops during welding.

4. A sealed greasable swivel connector comprising:

a first swivel head connectable to a load line and a second swivel head connectable to another line, said first swivel head having a cap with a cylindrical neck pressfit into a first end of a tubular member with a barrel cavity and with a first pulling eye, said cap having a sloped shoulder which intersects the neck forming a seal receiving space between the cap and the first end of the tubular member, a fillet of weld material in the seal receiving space connecting the cap to the first end of the tubular member and forming a metal substantially air-tight seal between the cap and the first end of the tubular member, an opening through the cap and the neck into which is seated a countersunk grease zerk for supplying grease into the barrel cavity of the tubular member, said tubular member having a first annular shoulder intermediate its length and a second annular shoulder proximate its second end, a thrust bearing with upper and lower races slide fitted into the tubular member with a first side abutted against the first annular shoulder, a bronze self-lubricating bushing press fitted into the tubular member with a first side abutted against the second annular shoulder, a bolt having a head, shank and threaded end, said head of the bolt abutted against a second side of the thrust bearing with the shank passing through the thrust bearing and bushing with a space formed between the first side of the thrust bearing and a second side of the bushing, said second swivel head having a nut with a bore threaded for attachment to the threaded end of the bolt and with a second pulling eye, said nut having a weld receiving recess in an outer side with a weld in the recess for groove welding the nut to the threaded end of the bolt, said bolt allowing for rotational movement between the first swivel head/tubular member and the second swivel head/bolt in the bearing and bushing.

5. The sealed greasable swivel connector of claim 4 wherein the first pulling eye comprises a first loop with first and second ends welded to opposite sides of the cap and the second pulling eye comprises a second loop with first and second ends welded to opposite sides of the nut.

6. The sealed greasable swivel connector of claim 5 wherein the first and second loops are formed from a rod and wherein the cap has opposing alignment grooves for receipt of the first and second ends of the first loop and wherein the nut has opposing alignment grooves for receipt of the first and second ends of the second loop to facilitate proper placement of the first and second loops during welding.

7. The sealed greasable swivel connector of claim 6 wherein first and second ends of the rod forming the first loop and the first and second ends of the rod forming the second rod are lap welded to the cap and nut, respectively.

8. The sealed greasable swivel connector of claim 4 wherein the weld receiving recess in the nut has sloped shoulders.

9. The sealed greasable swivel connector of claim 4 wherein the bolt is a shoulder bolt having a length such that the shoulder is in alignment with the second end of tubular member.

* * * * *